July 22, 1947.  J. R. MILES  2,424,282
BODY AND MODIFIED FIRST PORRO TYPE ERECTING
SYSTEM FOR TELESCOPIC INSTRUMENTS
Filed Nov. 3, 1943  3 Sheets-Sheet 1
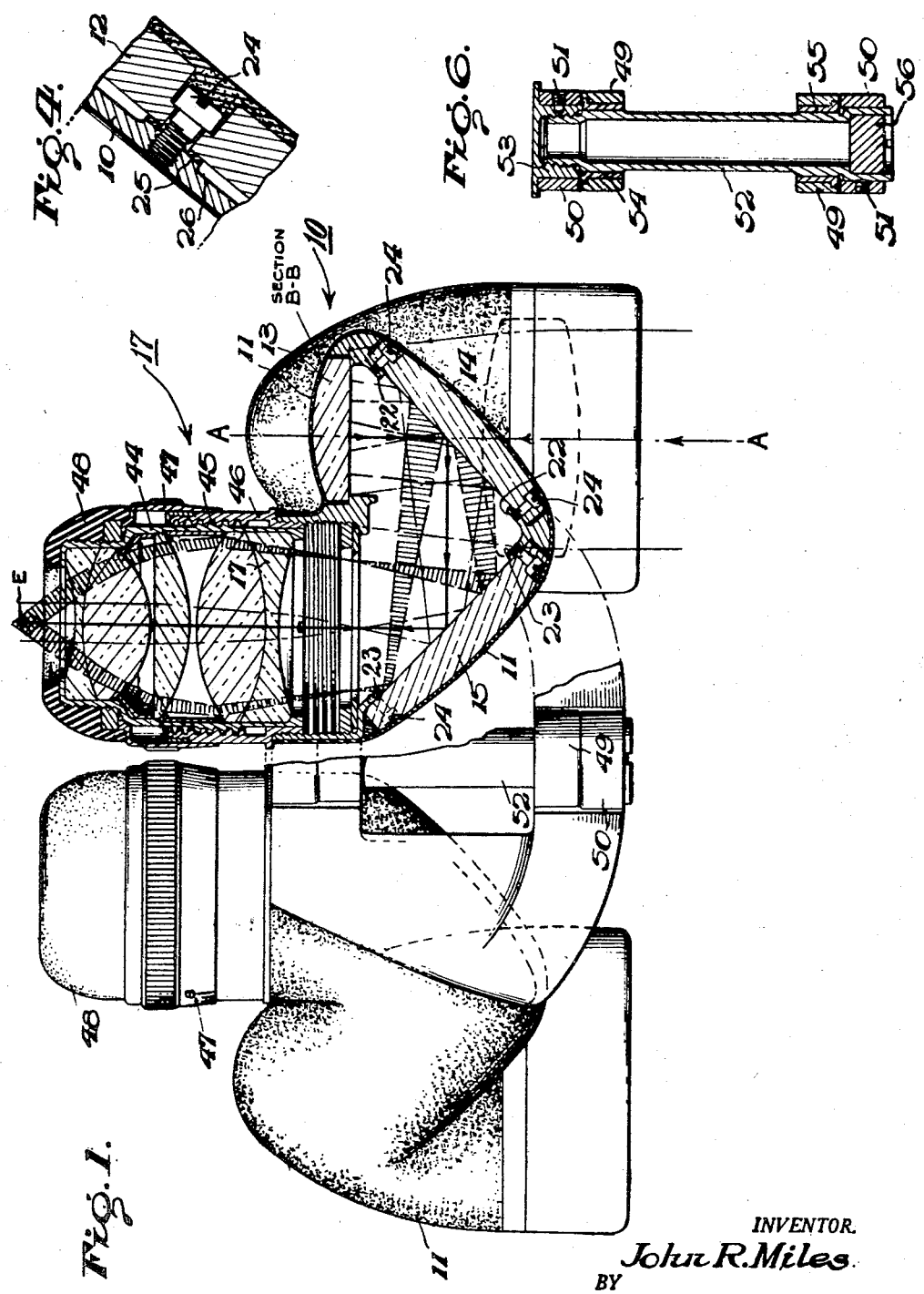
INVENTOR.
John R. Miles
BY
Herbert M. Birch
ATTORNEY

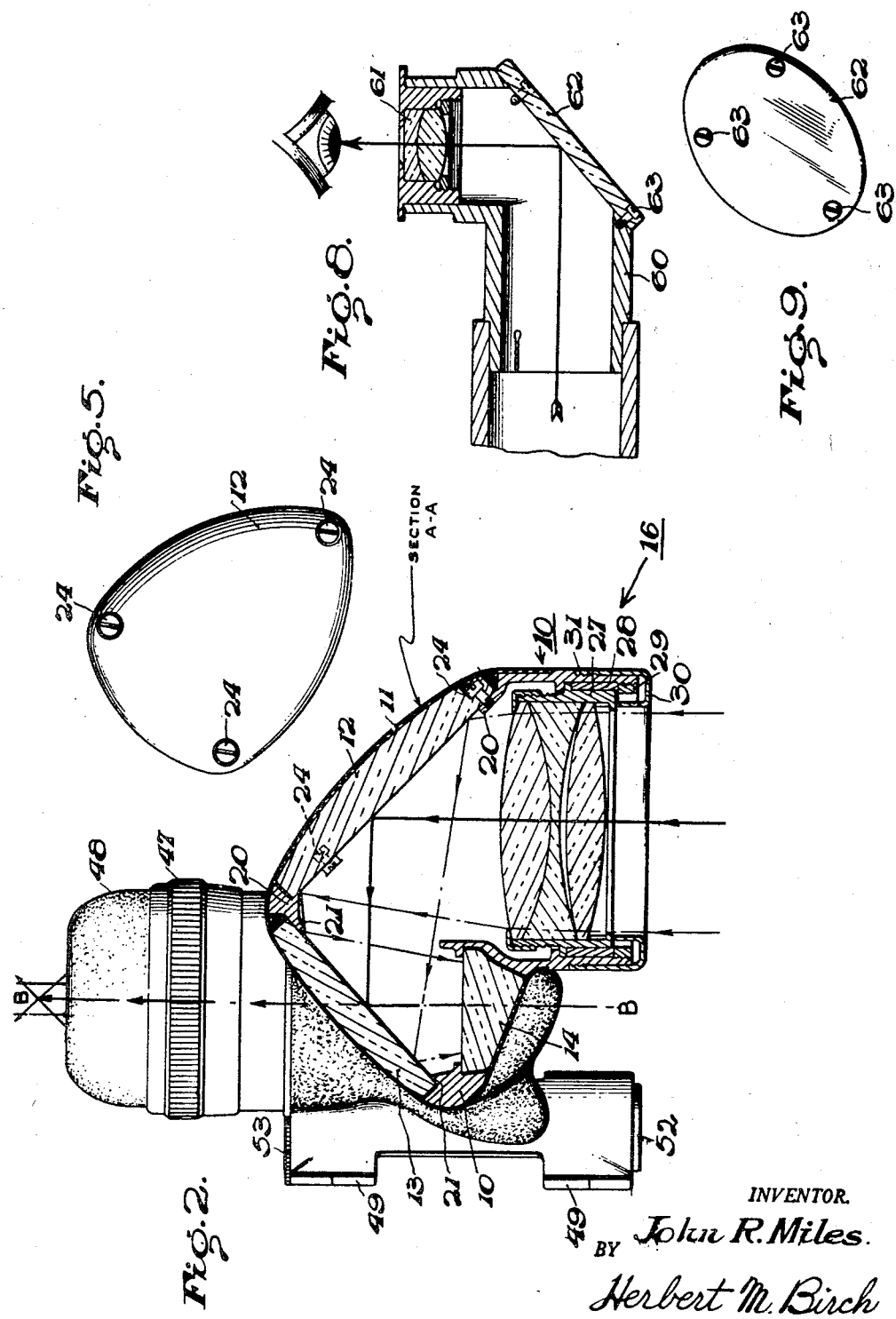

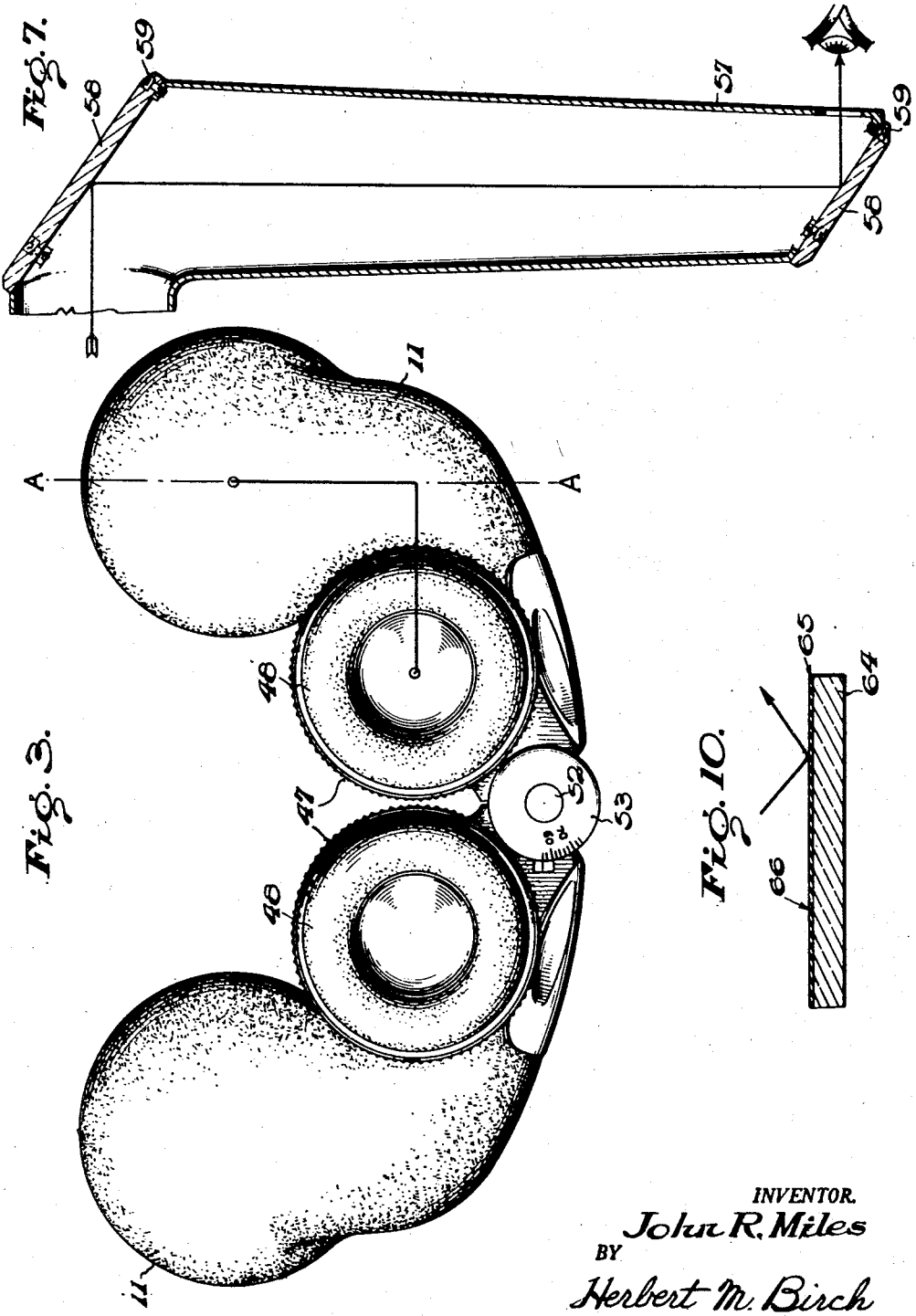

Patented July 22, 1947

2,424,282

UNITED STATES PATENT OFFICE 2,424,282

BODY AND MODIFIED FIRST PORRO TYPE ERECTING SYSTEM FOR TELESCOPIC INSTRUMENTS

John R. Miles, West Englewood, N. J., assignor to Bendix Aviation Corporation, Teterboro, N. J., a corporation of Delaware Application November 3, 1943, Serial No. 508,844

6 Claims. (Cl. 88—34)

1

The present invention relates generally to optical devices and more particularly to improvements in optical devices, such as telescopes and binoculars, or the like.

Heretofore in the manufacture of optical instruments, such as telescopes and binoculars, or the like, the most suitable characteristics are usually obtained principally by increasing the basic length of the instrument, and by the use of prisms to give an erect image as well as to shorten the overall length of the instrument. The use of prisms tends to cause the instrument to be heavy. In a few cases heretofore, mirrors have been used in the manufacture of optical instruments of this type, but in these cases fullest advantage was not taken of the possibility of arranging the mirrors to provide the utmost shortening of the optical length.

Accordingly, it is an object of the present invention to provide novel means, whereby a compact light weight instrument of the class described is built, which makes it possible to simultaneously combine desirable optical characteristics not obtained with prior instruments.

Another object is to provide a novel instrument shell for binoculars or the like, so shaped and so proportioned as to form seats for a novel set of mirrors adapted to cooperate with an objective and eyepiece so as to combine in a single instrument desirable characteristics such as, a large field of view; a large aperture of objective; a large bundle of light rays at the edge of the field of view; a considerable correction for astigmatism; and short basic length.

Another object is to provide a novel instrument shell designed for cooperation with a plurality of novelly arranged mirrors having their outer surfaces designed to merge with the outside curves of the shell and their inner used reflecting surfaces arranged in overlapping relation, so as to combine with an objective lens construction, such as is defined and illustrated in co-pending application Serial No. 501,161, filed September 3, 1943, which matured as Patent 2,417,942 on March 25, 1947, and an eyepiece lens construction, such as is defined in co-pending application Serial No. 502,335, which matured as Patent 2,419,151 on April 15, 1947, filed September 14, 1943, both of said applications being assigned to the assignee of the present invention; whereby said lenses combine to correct for both lateral and longitudinal chromatic aberrations, and thereby cooperate with the novel shell and mirror arrangement to correct for coma at the edge of the field and spherical aberrations in the entire system,

2 while providing a considerable correction for astigmatism.

Another object is to provide, in combination with a suitable objective and a suitable eyepiece, a novel arrangement of mirrors in a novel casing, wherein all surfaces may be formed by machining, forging or the like to simplify production, reduce time and cost, and increase durability and utility.

The above and other objects and advantages of the present invention will appear more fully hereinafter from a consideration of the detailed description which follows, taken together with the accompanying drawings wherein one embodiment of the invention is illustrated. It is to be expressly understood, however, that the drawings are for the purpose of illustration only and are not designed as a definition of the limits of the invention. Reference for this latter purpose should be had to the appended claims.

In the drawings, wherein like reference characters refer to like parts throughout the several views, Figure 1 shows a plan view partly in elevation and partly in cross section of a binocular or the like taken through the eyepiece at the top of the instrument, constructed in accordance with one form of the present invention.

Figure 2 is a side view, with a vertical section taken through the objective at the front of the instrument.

Figure 3 is an inverted rear view of the complete instrument, such as shown in the above figures.

Figure 4 is a detail sectional view of a mirror mounting.

Figure 5 is a plan view of the first mirror.

Figure 6 is a longitudinal section view of a form of hinge used for binoculars or the like.

Figure 7 is a section view of another form of a periscope, illustrating a construction which also has generally elliptical mirrors.

Figure 8 is a longitudinal section view of another periscope which also has generally elliptical mirrors.

Figure 9 is a top plan of the mirror used in connection with Figure 8.

Figure 10 is a cross section view of one form of mirror construction.

Referring to the drawings for a more detailed description of the present invention, numeral 10 is a shell or the skeleton which supports the mirrors 12, 13, 14 and 15 best shown in Figures 1 and 2.

The mirrors may be designed so that the back of each is rounded to fit and merge with the outside rounded surfaces of the shell 10 and thereby complete the curves defined thereby. Each mirror back cooperates with the outside curves and contours of the shell or casing 10, so as to form a foundation for the casing skin 11. The skin 11 is made of any suitable semi-flexible material for sealing the shell or casing 10, and also serves as a shock absorber to protect the interior parts of the instrument, as well as heat insulator to provide a "warm" surface for the user's hands in cold climates.

The shell 10 which supports the mirrors may be made of any suitable material, such as aluminum or other machinable material, so shaped and so proportioned as to properly define the angles of the mirrors 12, 13, 14 and 15 with respect to each other for the most efficient projection of the image from the objective lens unit 16 to the eyepiece lens unit 17. Such novelly shaped casing 10 thereby eliminates the customary use of prisms for this purpose and provides for compactness in the novel combination.

The mirrors 12, 13, 14 and 15, may be made of metal instead of glass if desired, and are attached to shell 10 in openings orderly arranged around the same and defined by flanges 20, 21, 22 and 23 by suitable means such as screws 24. The mirrors, if desired, may be made adjustable by any suitable means, such as by washers 25, shown in enlarged view in Figure 4, of varying thickness placed between the mirrors 12, 13, 14 and 15 and their respective supporting surfaces or flanges 20, 21, 22 and 23 forming countersunk or depressed seats for the mirrors, which surfaces may be suitably formed. This arrangement of washers 25 provides for adjustment of the mirrors to correct for errors in the flatness of the metal supporting surfaces 20, 21, 22 and 23 of the shell body 10, which otherwise might warp the accurately polished mirror surfaces, and also provides means for adjusting the angles between the mirrors by a choice of washers of different thicknesses for such adjustments. Small bosses, protrusions, or pads 26 on "body" or shell 10, may be substituted for or used in addition to these washers, as also shown in Figure 4 and will give a multiple-point contact or seat for the reflecting members or mirrors with or without the washers 25, to insure proper seating of the mirrors without the accuracy required of the plane supporting surfaces or flanges 20, 21, 22 and 23 without the washers 25 and/or the bosses 26.

In addition to the novel shell structure 10, the novel arrangement of mirrors and the novel means of mounting them, the device shown in Figures 1, 2 and 3 includes an objective unit 16, and an eyepiece unit 17. The device may be used in the inverted position shown in Figure 3 with the objective unit portions extending upwardly as binoculars, as a telescope or periscope, such as in a trench, to obtain some lowering of the eyepiece lens units and elevation of the objective lens units. However when used as binoculars in the normal position with the objective lens unit portions extending downwardly, the nose is accommodated between the eyepiece lens unit portions, which is preferable, and the device is more convenient to handle by grasping the downwardly extending objective lens unit portions and at the top thereof. Also, the device will lay better or flat against the front of the abdomen or chest of a person when not in use and suspended or hung by a strap or loop from around the neck with the objective lens unit portions extending inwardly toward the body instead of outwardly, especially when the device is spread or opened out in any desired relative angular position of the two binocular sections as hereinafter described.

Any suitable means may be employed to mount the objective unit 16, such as lens holder 27 and adjusting rings 28 and 29, which are mounted in the objective end of the shell and locked therein by annulus 30 and threads 31 on the outside of shell 10.

The shell 10 is provided with an aperture defined by surface 20 extending upwardly and angularly across the object lens 16. Surface 20 may be countersunk from outside the shell 10 upon which rests the first mirror 12. The rounded back of the mirror in this form cooperates to provide a continuous rounded contour for outside casing skin 11 to fit over.

The second mirror supporting surface is provided for by flanges 21, so that when the second mirror 13 is seated thereon, it may (referring to Fig. 2) lap over the upper edge of mirror 12 and extend angularly downward from said upper edge of mirror 12. The round back of this mirror also may merge with the outside rounded contours of shell 10.

The third mirror 14 is positioned below mirror 13 on mirror supporting surfaces 22 and extend angularly substantially perpendicularly toward the fourth mirror 15, which is positioned below and across the eyepiece lens unit 17 off-set from the objective aperture. Mirrors 13 and 14 also overlap or overlie and overhang or extend beyond each other in directions normal to each other in a novel relation permitting the compactness of structure, results and advantages related. However the first mirror 12 overlaps the fourth mirror 15 almost completely along the direction of the line of sight.

Mirrors 14 and 15 are each similarly seated on flanges such as 22 and 23 in which their rounded back portions may cooperate with the outer shell contour as described with respect to mirrors 12 and 13. The foregoing arrangement may be best followed by reference to Figures 1 and 2 of the drawings and as shown the eyepiece lens unit 17 mechanism is positioned directly behind the mirror 15 in shell 10, the mirror 12 is positioned directly behind the objective 16 mechanism in the shell and mirrors 13 and 14 are positioned in inverted angular overlapping relation to each other intermediate the mirrors 12 and 15, so as to project an image along the arrow lines, shown in Figures 1 and 2 from the objective lens 16 through the eyepiece 17 to a point E at the pupil of the operator. The reflecting surfaces of the mirrors are shown arranged in the same manner as Porro's well known first or Porro-one system of plane erecting reflectors. The arrangement of overlapping edges of the adjacent mirror edges may be used to provide for greater compactness.

The passage of a light ray beam through the binocular is shown in Fig. 1. This shows the way in which the folded working space of the optical system substantially fills the actual space within the binocular. Since it has a minimum of waste space, this binocular body is most compact for its performance. It is apparent from Figure 1 that the second pair (14, 15) of reflectors overlaps the first pair (12, 13) in the direction of the line of sight, i. e., at least an optically used portion of the second pair of reflecting surfaces is to the rear of a plane normal to the line of sight (parallel with A—A in this figure) and touching the leading edge of the optically used surface of at least one (e. g. surface 12) of the first pair of reflectors. In other words in the language of the claims, "overlap" means that an optically used portion of a reflecting surface of said second pair is to the rear of a plane which is normal to the line of sight and touches the front edge of the furthest forward optically used portion of the first pair of reflecting surfaces, where the forward direction is toward the object. This produces a considerable saving in space over the conventional Porro-one, or first Porro arrangement in which a prism forming the first pair of reflectors is entirely forward of another prism forming the second pair of reflectors.

The eyepiece lens unit, which may take the form of that described in the above-mentioned co-pending application Serial No. 502,335, filed September 14, 1943, may be associated with any suitable type adjustable mounting, which may comprise a mounting sleeve or bushing 44, for mounting the lenses of the eyepiece unit 17, which bushing 44 may be provided around the outer diameter with spiral threads 45, adapted to interengage with complementary threads, on the interior of an outer sleeve 46.

The bushing or eyepiece mount 44 may be secured to scale 47 after adjustments of corrected diopter reading. A suitable rubber cap 48 may be fitted over the end of the eyepiece lens mount 44. The binoculars or the like shown in the drawings have now been described for one telescope from objective means to eyepiece means, and it is of course, understood that the opposite telescope is of the same type of construction. However, the present device is provided with a pintle type hinge adapted to connect the binocular sections 10 together, through pintle receiving loops 49 and 50 formed from the binocular sections.

The hinge as shown in Figure 6, comprises a tube 52 tapered at each end. A plug 53 is fastened to one of the two bodies 10 at a loop 50 by screw 51, and the tube 52 is externally threaded at an end to fit into plug 53 and contains threadless plug 56 at the other end. The tapered tube 52 may thus be moved longitudinally to frictionally engage with the other body or bushings 54 and 55 in the loops 49 to provide frictional resistance to the swivel action of the two binocular sections. This will provide for retaining the two sections in any relative angular position desired for use.

In operation, the objective lens unit and the eyepiece lens unit, hereinbefore referred to, as described in my co-pending applications may be compensated from zero aberration calculations so as to cooperatively combine and correct for both lateral and longitudinal chromatic aberrations; and thereby in further cooperation with the skewed shell and arrangement of mirrors, correct for spherical aberration at, and coma near the edge of the field in the entire system, while providing a considerable correction for astigmatism.

Figure 7 shows a simple periscope, which employs another form of the shell 10 and mirror arrangement referred to, in which mirrors 58 are fastened to shell 57 by some suitable means such as screws 59. Mirrors 58 again act as a combination of cover and mirror. It will be noted that there are only three parts to the instrument shown in Figure 7, while usually in previous instruments at least five parts are required, the result of which would be a heavier device than that shown in Figure 7.

Figures 8 and 9 show a right angle eyepiece device which represents another application for the mirror and shell arrangement referred to. Shell 60 presents an external surface to which mirrors 62 is fastened by some suitable means such as the screws 63. Eye lens 61 is used in a similar way as in the prior art when prisms or conventional mirrors are used. In this application, mirror 62 does not conform to the external surface of the shell 60 and shell 60 is not countersunk to receive mirror 62, but are both constructed in a more simple manner. Figures 7-9 illustrate constructions using elliptical mirrors.

Figure 10 shows a novel construction of the mirrors such as may be used in practicing the invention. The mirrors may be made of some suitable rigid base material 64, such as aluminum. The base 64 is coated with another material 65 such as chromium which is more suitable to grinding and polishing to an optical finish. If the whole of the mirror were made of this material, it would be heavy and difficult to machine and form; however, base 64 may be suitably formed as by machining, forging or the like to the desired shape before plating or coating and then plated, after which coating 65 may be ground and polished to an optical finish. Numeral 66 represents a coating of some suitable high reflecting material, such as silver or evaporated aluminum, which in turn may be protected by a thin transparent film such as aluminum oxide or quartz, or a thin film of very resistant metal, so thin as to not affect the reflectivity of the finished mirror.

There is thus provided a novel arrangement for binoculars or the like embodying a novel shell provided with outside machinable surfaces to support a plurality of mirrors shaped to merge with the outside shell contour and arranged to cooperate with suitable objective and eyepiece units to provide the most desirable characteristics of performance, while obtaining compactness, lightness and relatively simplified manufacturing features.

Although the present invention is only described and illustrated in detail for one embodiment thereof, it is to be expressly understood that the same is not limited thereto. Various changes may be made in design and arrangement of the principal embodiment illustrated, as will now be apparent to those skilled in the art. For a definition of the limits of the invention, reference should be had to the appended claims.

The equivalent, or effective, front aperture stop is located where, for a horizontal line of sight, the line of the uppermost ray of the bundle of rays going from the objective to the upper edge of the field stop intersects the line of the uppermost ray of the bundle of rays going from the upper edge of the objective to the center of the field stop. The equivalent front aperture stop is located substantially at the midsection of reflector 14 shown in Fig. 2. For a given real field, the front aperture stop affects the edge illumination.

The Porro-one erecting system as used in a telescope, has four reflecting surfaces of which the first two form a first pair and the last two a second pair, each of the first and second pairs having its reflecting surfaces normal to each other, and the plane including a ray twice reflected by one pair is normal to that including a ray twice reflected by the other pair. The conventional Porro-one, or the first Porro type or, arrangement, whether for prisms or mirrors, follows that for prisms in which there is a symmetrical right-angle prism for each pair, and the two prisms are crossed, i. e. with their longest faces parallel, toward each other, and arranged in L-fashion with the longest sides of one prism normal to those of the other prism, without any overlap of the prisms themselves in the direction of the line of sight.

What is claimed is:

1. An optical system having an objective, an eyepiece, a first Porro type erecting system having four reflecting surfaces, and a housing operatively connecting them all, characterized in that: said reflecting surfaces are arranged to have the used areas of a reflecting surface of each of the first and second pairs of reflecting surfaces overlap in the direction of the line of sight so that an optically used portion of a reflecting surface of said second pair is to the rear of a plane which is normal to the line of sight and touches the front edge of the furthest forward optically used portion of the first pair of reflecting surfaces, where the forward direction is toward the object.

2. An optical system having an objective, an eyepiece, a first Porro type erecting system consisting of four mirrors, and a housing operatively connecting them all, characterized in that: said mirrors are arranged to have overlap, in the direction of the line of sight, of the optically used portion of a mirror of each of the first and second pairs of mirrors so that an optically used portion of a mirror of said second pair is to the rear of a plane which is normal to the line of sight and touches the front edge of the furthest forward optically used portion of the first pair of mirrors, where the forward direction is toward the object.

3. An optical system having an objective, and an eyepiece with a double-truncated-conical optical space required when unfolded, a first Porro type erecting system consisting of four reflecting surfaces, and a housing operatively connecting them all, characterized in that: said surfaces are arranged to have the used areas of a reflecting surface of each of the first and second pairs of reflecting surfaces overlap, in the direction of the line of sight, so that an optically used portion of a reflecting surface of said second pair is to the rear of a plane which is normal to the line of sight and touches the front edge of the furthest forward optically used portion of the first pair of reflecting surfaces, where the forward direction is toward the object, and each of the reflectors is at least approximately elliptical in outline and of the minimum size practicable with the required optical space, with each outer reflector considerably larger than its adjacent inner reflector, each of the reflectors being attached to the housing to form part of the wall thereof, and the housing being shaped to substantially conform to the working optical space.

4. A hand-held optical device having an objective, an eyepiece, a first Porro type erecting system consisting of four mirrors, and a housing operatively connecting them all, characterized in that: said mirrors are arranged to have an optically used portion of a mirror of each of the first and second pairs of mirrors overlap in the direction of the line of sight so that an optically used portion of a mirror of said second pair is to the rear of a plane which is normal to the line of sight and touches the front edge of the furthest forward optically used portion of the first pair of mirrors, where the forward direction is toward the object, and the housing contains holes closely fitting the mirrors and mounting means for the mirrors sufficiently sunk below the outer surface of the housing to bring the backs of the mirrors substantially flush with the adjacent outer surfaces of the housing and is shaped to closely fit the working optical space.

5. An optical device haveing an objective and an eyepiece with a double-truncated-conical optical space required when unfolded, a first Porro type erecting system consisting of four mirrors, and a housing operatively connecting them all, characterized in that: each of the mirrors is at least approximately elliptical in outline and generally substantially of the minimum size practicable with the required optical space when the latter is folded for erection of the image, with each outer mirror considerably larger than its adjacent inner mirror; said mirrors are arranged to have an optically used portion of a mirror of each of the first and second pairs of mirrors overlap, in the direction of the line of sight, so that an optically used portion of a mirror of said second pair is to the rear of a plane which is normal to the line of sight and touches the front edge of the furthest forward optically used portion of the first pair of mirrors, where the forward direction is toward the object; the housing closely fits the folded optical space but is generally arched in two directions and contains holes closely fitting the mirrors and mounting means for the mirrors sufficiently sunk below the outer surface of the housing to bring the backs of the mirrors substantially flush with the adjacent outer surfaces of the housing; each of the mirrors is of the front-surface type, and the backs of the mirrors are shaped to generally conform approximately tangentially with the shapes of the adjacent outer surfaces of the housing to provide a better shape for covering and holding.

6. A first Porro type erecting system for optical instruments characterized in that its reflecting surfaces are arranged to have overlap, in the direction of the line of sight, of the optically used portion of a reflecting surface of each of the first and second pairs of reflecting surfaces so that an optically used portion of a reflecting surface of said second pair is to the rear of a plane which is normal to the line of sight and touches the front edge of the furthest forward optically used portion of the first pair of reflecting surfaces, where the forward direction is toward the object.

JOHN R. MILES.

REFERENCES CITED

The following references are of record in the file of this patent:

UNITED STATES PATENTS

| Number | Name | Date |
|---|---|---|
| 2,381,909 | Husted | Aug. 14, 1945 |
| 2,378,396 | Fassin | June 19, 1945 |
| 1,802,048 | Cover | Apr. 21, 1931 |
| 826,155 | Dudley | July 17, 1906 |
| 1,892,893 | Karnes | Jan. 3, 1933 |
| 2,079,890 | Wollensak et al. | May 11, 1937 |
| 254,392 | Serdinko | Feb. 28, 1882 |

(Other references on following page)

UNITED STATES PATENTS

| Number | Name | Date |
|---|---|---|
| 846,902 | Comer | Mar. 5, 1907 |
| 2,068,829 | Albada | Jan. 26, 1937 |
| 1,311,846 | Chretien | July 29, 1919 |
| 1,531,615 | Hunt et al. | Mar. 31, 1925 |
| 765,607 | Aitchison | July 19, 1904 |
| 2,267,711 | Bailey | Dec. 30, 1941 |
| 1,346,308 | Edstrom | July 13, 1920 |
| 2,015,527 | Konig | Sept. 24, 1935 |
| 918,147 | Hastings | Apr. 13, 1909 |
| 2,358,316 | Chwalow | Sept. 19, 1944 |
| 2,173,142 | Thurlow et al. | Sept. 19, 1939 |
| 1,152,156 | Falk | Aug. 31, 1915 |
| 2,128,791 | Benford | Aug. 30, 1938 |
| 1,842,925 | Willmott | Jan. 26, 1932 |
| 1,533,248 | Harwix | Apr. 14, 1925 |
| 2,346,291 | Cisski | Apr. 11, 1944 |
| 1,884,155 | Oestnaes et al. | Oct. 25, 1932 |
| 2,155,164 | Harris | Apr. 18, 1939 |
| 2,323,787 | Bitner | July 6, 1943 |
| 1,364,381 | Kent | Jan. 4, 1921 |
| 1,397,156 | Baumann | Nov. 15, 1921 |
| 1,784,710 | Showalter | Dec. 9, 1930 |
| 2,084,327 | Edwards | June 22, 1937 |
| 2,108,604 | Mason | Feb. 15, 1938 |
| 2,179,491 | Cain | Nov. 14, 1939 |
| 2,135,531 | Reichert | Nov. 8, 1938 |
| 1,249,163 | Mihalyi | Dec. 4, 1917 |
| 2,285,388 | Benard | June 9, 1942 |
| 1,952,224 | Trautmann | Mar. 27, 1934 |
| 1,863,099 | Bowen | June 14, 1932 |
| 1,955,590 | Lee | Apr. 17, 1934 |
| 1,584,272 | Bertele | May 11, 1926 |

FOREIGN PATENTS

| Number | Country | Date |
|---|---|---|
| 394,145 | Germany | Apr. 23, 1924 |
| 476,147 | Great Britain | Dec. 2, 1937 |
| 337,340 | France | Feb. 13, 1904 |
| 215,331 | Great Britain | Jan. 15, 1925 |
| 16,443 | Great Britain | Sept. 15, 1900 |
| 3,596 | Great Britain | Feb. 16, 1903 |
| 73,310 | Switzerland | Sept. 16, 1916 |